United States Patent
Morgan et al.

(10) Patent No.: US 12,392,353 B2
(45) Date of Patent: Aug. 19, 2025

(54) CENTRIFUGAL COMPRESSOR WITH LABYRINTH SEAL

(71) Applicant: DAIKIN INDUSTRIES, LTD., Osaka (JP)

(72) Inventors: Jeffrey Allen Morgan, Plymouth, MN (US); Maxwell Person, St. Louis Park, MN (US)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/462,687

(22) Filed: Sep. 7, 2023

(65) Prior Publication Data
US 2025/0084862 A1    Mar. 13, 2025

(51) Int. Cl.
*F04D 29/08*    (2006.01)
*F04D 17/10*    (2006.01)
*F04D 29/16*    (2006.01)
*F16J 15/447*   (2006.01)
*F25B 1/04*     (2006.01)

(52) U.S. Cl.
CPC .......... *F04D 29/083* (2013.01); *F04D 17/10* (2013.01); *F04D 29/162* (2013.01); *F16J 15/447* (2013.01); *F25B 1/04* (2013.01)

(58) Field of Classification Search
CPC ........ F04D 17/10; F04D 29/083; F04D 29/16; F04D 29/161; F04D 29/162; F16J 15/447; F16J 15/4472; F05D 2250/712; F05D 2240/55
See application file for complete search history.

(56) References Cited

U.S. PATENT DOCUMENTS

| 3,231,285 | A | * | 1/1966 | Weltmer | F16J 15/4472 277/418 |
|---|---|---|---|---|---|
| 3,940,153 | A |   | 2/1976 | Stocker |   |
| 4,335,886 | A | * | 6/1982 | Frey | F16J 15/4472 415/111 |
| 5,639,095 | A |   | 6/1997 | Rhode |   |

(Continued)

OTHER PUBLICATIONS

Written Opinion for the corresponding international application No. PCT/JP2024/032204, issued on Nov. 28, 2024.

(Continued)

*Primary Examiner* — Brian P Wolcott
(74) *Attorney, Agent, or Firm* — GLOBAL IP COUNSELORS, LLP

(57) ABSTRACT

A compressor for an HVAC system includes a stator and a rotor. The stator has a stator profile. The rotor has a rotor profile. The rotor is rotatable about a rotational axis. The stator and the rotor are separated from each other by a gap formed between the stator profile and the rotor profile. The gap includes an inlet, an outlet, and at least two cavities connected by a channel. Each cavity includes a first concave portion defined by the stator profile and a second concave portion defined by the rotor profile. The first concave portion is positioned at least partially opposite from the second concave portion. The first concave portion extends in a first direction and the second concave portion extends in a second direction opposite to the first direction. The first direction and the second direction are within about 45 degrees of opposite of each other.

11 Claims, 10 Drawing Sheets

(56) References Cited

U.S. PATENT DOCUMENTS

| | | | | |
|---|---|---|---|---|
| 7,445,213 B1* | 11/2008 | Pelfrey | ............... | F01D 11/02 |
| | | | | 277/420 |
| 8,858,162 B2 | 10/2014 | Manzoori | | |
| 10,281,046 B2* | 5/2019 | Daussin | ............... | F16J 15/4472 |
| 11,365,740 B2* | 6/2022 | Masaki | ............... | F04D 29/284 |
| 11,692,557 B2* | 7/2023 | Wilson | ............... | F04D 29/162 |
| | | | | 415/170.1 |
| 2021/0010478 A1* | 1/2021 | Masaki | ............... | F04D 29/286 |
| 2022/0186842 A1* | 6/2022 | Daniels | ............... | F02B 37/183 |
| 2022/0213896 A1* | 7/2022 | Wilson | ............... | F04D 17/122 |

OTHER PUBLICATIONS

International Search Report for the corresponding international application No. PCT/JP2024/032204, issued on Nov. 28, 2024.

\* cited by examiner

CENTRIFUGAL COMPRESSOR WITH LABYRINTH SEAL

BACKGROUND

Field of the Invention

The present invention generally relates to a centrifugal compressor used in a chiller system. More specifically, the present invention relates to a centrifugal compressor having a labyrinth seal.

Background Information

A chiller system is a refrigerating machine or apparatus that removes heat from a medium. Commonly, a liquid, such as water, is used as the medium and the chiller system operates in a vapor-compression refrigeration cycle. This liquid can then be circulated through a heat exchanger to cool air or equipment as required. As a necessary byproduct, refrigeration creates waste heat that must be exhausted to the ambient surroundings or, for greater efficiency, recovered for heating purposes. A conventional chiller system often utilizes a centrifugal compressor, which is often referred to as a turbo compressor. Thus, such chiller systems can be referred to as turbo chillers. Alternatively, other types of compressors, e.g. a screw compressor, can be utilized.

In a conventional (turbo) chiller, refrigerant is compressed in the centrifugal compressor and sent to a heat exchanger in which heat exchange occurs between the refrigerant and a heat exchange medium (liquid). This heat exchanger is referred to as a condenser because the refrigerant condenses in this heat exchanger. As a result, heat is transferred to the medium (liquid) so that the medium is heated. Refrigerant exiting the condenser is expanded by an expansion valve and sent to another heat exchanger in which heat exchange occurs between the refrigerant and a heat exchange medium (liquid). This heat exchanger is referred to as an evaporator because refrigerant is heated (evaporated) in this heat exchanger. As a result, heat is transferred from the medium (liquid) to the refrigerant, and the liquid is chilled. The refrigerant from the evaporator is then returned to the centrifugal compressor and the cycle is repeated. The liquid utilized is often water.

A conventional centrifugal compressor basically includes a casing (housing), an inlet guide vane, an impeller, a diffuser, a motor, various sensors and a controller. Refrigerant flows in order through the inlet guide vane, the impeller and the diffuser. Thus, the inlet guide vane is coupled to a gas intake port of the centrifugal compressor while the diffuser is coupled to a gas outlet port of the impeller. The inlet guide vane controls the flow rate of refrigerant gas into the impeller. The impeller increases the velocity (kinetic energy) of refrigerant gas. The diffuser works to transform the velocity of refrigerant gas (dynamic pressure) discharged from the impeller into (static) pressure. The motor rotates the impeller. The controller controls the motor, the inlet guide vane and the expansion valve. In this manner, the refrigerant is compressed in a conventional centrifugal compressor. The inlet guide vane is typically adjustable and the motor speed is typically adjustable to adjust the capacity of the system. In addition, the diffuser may be adjustable to further adjust the capacity of the system. In addition to controlling the motor, the inlet guide vane and the expansion valve, the controller can further control any additional controllable elements, such as the diffuser.

Some centrifugal compressors for chillers have multiple compression stages to achieve a higher degree of compression. Some multistage centrifugal compressors have an in-line configuration in which the impellers are disposed adjacently along the axial direction of the centrifugal compressor and the motor is disposed on one side of the compressor housing (e.g., the discharge side). There are also two-stage centrifugal compressors in which the motor is disposed between the two stages of the centrifugal compressors.

SUMMARY

An object of the present invention is to provide a centrifugal compressor with a labyrinth seal to substantially prevent refrigerant leakage around an outside of an impeller.

In view of the state of the known technology, one aspect of the present disclosure is to provide a compressor for an HVAC system. The compressor includes a stator and a rotor. The stator has a stator profile. The rotor has a rotor profile. The rotor is rotatable about a rotational axis. The stator and the rotor are separated from each other by a gap formed between the stator profile and the rotor profile. The gap includes an inlet, an outlet, and at least two cavities connected by a channel. Each cavity includes a first concave portion defined by the stator profile and a second concave portion defined by the rotor profile. The first concave portion is positioned at least partially opposite from the second concave portion. The first concave portion extends in a first direction and the second concave portion extends in a second direction opposite to the first direction. The first direction and the second direction are within about 45 degrees of opposite of each other.

Another aspect of the present disclosure is to provide a chiller system including a condenser, an evaporator, and a compressor. The compressor includes an impeller assembly. An input suction line is configured for gas refrigerant movement from the evaporator to the compressor. An output discharge line is configured for gas refrigerant movement from the compressor to the condenser. A motor assembly is configured to drive the compressor. The impeller assembly includes a stator having a stator profile and a rotor having a rotor profile. The rotor being rotatable about a rotational axis. The stator and the rotor are separated from each other by a gap formed between the stator profile and the rotor profile. The gap includes an inlet, an outlet, and at least two cavities connected by a channel. Each cavity includes a first concave portion defined by the stator profile and a second concave portion defined by the rotor profile. The first concave portion is positioned at least partially opposite from the second concave portion.

Another aspect of the present disclosure is to provide a stepped labyrinth seal for rotatable members in a compressor assembly. The compressor assembly includes a stator having a stator profile, and a rotor having a rotor profile. The rotor is rotatable about a rotational axis. The stator and the rotor are separated from each other by a gap formed between the stator profile and the rotor profile. The gap includes an inlet, an outlet, and at least two cavities connected by a channel. Each cavity includes a first concave portion defined by the stator profile and a second concave portion defined by the rotor profile. The first concave portion is positioned at least partially opposite from the second concave portion. The channel includes a plurality of grooves.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF EXEMPLARY EMBODIMENT

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
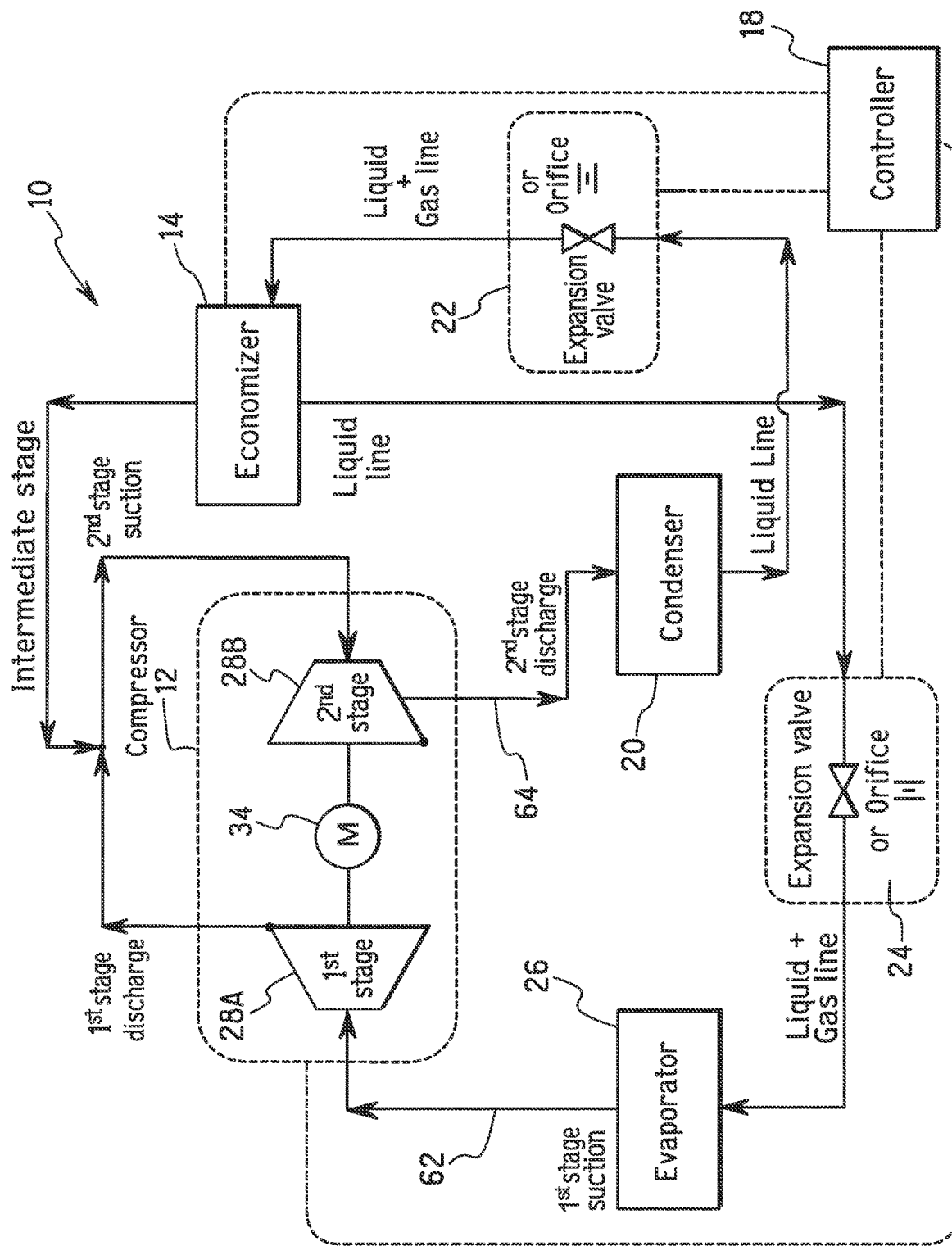
FIG. 1 is a schematic diagram illustrating a two stage chiller system having a centrifugal compressor in accordance with an exemplary embodiment.

Referring initially to FIG. 1, a chiller, or HVAC, system 10 having a centrifugal compressor, or compressor assembly, 12 in accordance with an exemplary embodiment is illustrated. The centrifugal compressor 12 of FIG. 1 is a two-stage compressor, and thus, the chiller system 10 of FIG. 1 is a two stage chiller system. The two-stage chiller system of FIG. 1 also includes an optional economizer 14. FIG. 1 merely illustrates an example of a chiller system 10 in which a centrifugal compressor 12 in accordance with the exemplary embodiment can be used.

The chiller systems 10 is conventional, except for the centrifugal compressor 12, which includes a labyrinth seal 16, as shown in FIGS. 3-6. Therefore, the chiller system 10 will not be discussed and/or illustrated in detail herein except as related to the centrifugal compressor 12, which includes the labyrinth seal 16. However, it will be apparent to those skilled in the art that the conventional parts of the chiller system 10 can be constructed in a variety of ways without departing from the scope of the present invention.

The chiller system 10 is preferably a water chiller that utilizes cooling water and chiller water in a conventional manner.

The chiller system 10 includes a chiller controller 18, the two-stage centrifugal compressor 12, a condenser 20, a first expansion valve or orifice (expansion mechanism) 22, an economizer 14, a second expansion valve or orifice (expansion mechanism) 24, and an evaporator 26 connected together in series to form a loop refrigeration cycle, as shown in FIG. 1. Refrigerant gas moves from the evaporator 26 to the compressor 12 through an input suction line 62. Refrigerant gas moves from the compressor 12 to the condenser 20 through an output discharge line 64. However, the economizer 14 can be removed. In either case, various sensors (not shown) are disposed throughout the circuits of the chiller system 10 to control the chiller system 10 in a conventional manner. A capillary tube can be used for the first and second expansion mechanisms 22 and 24.

Figure 2:
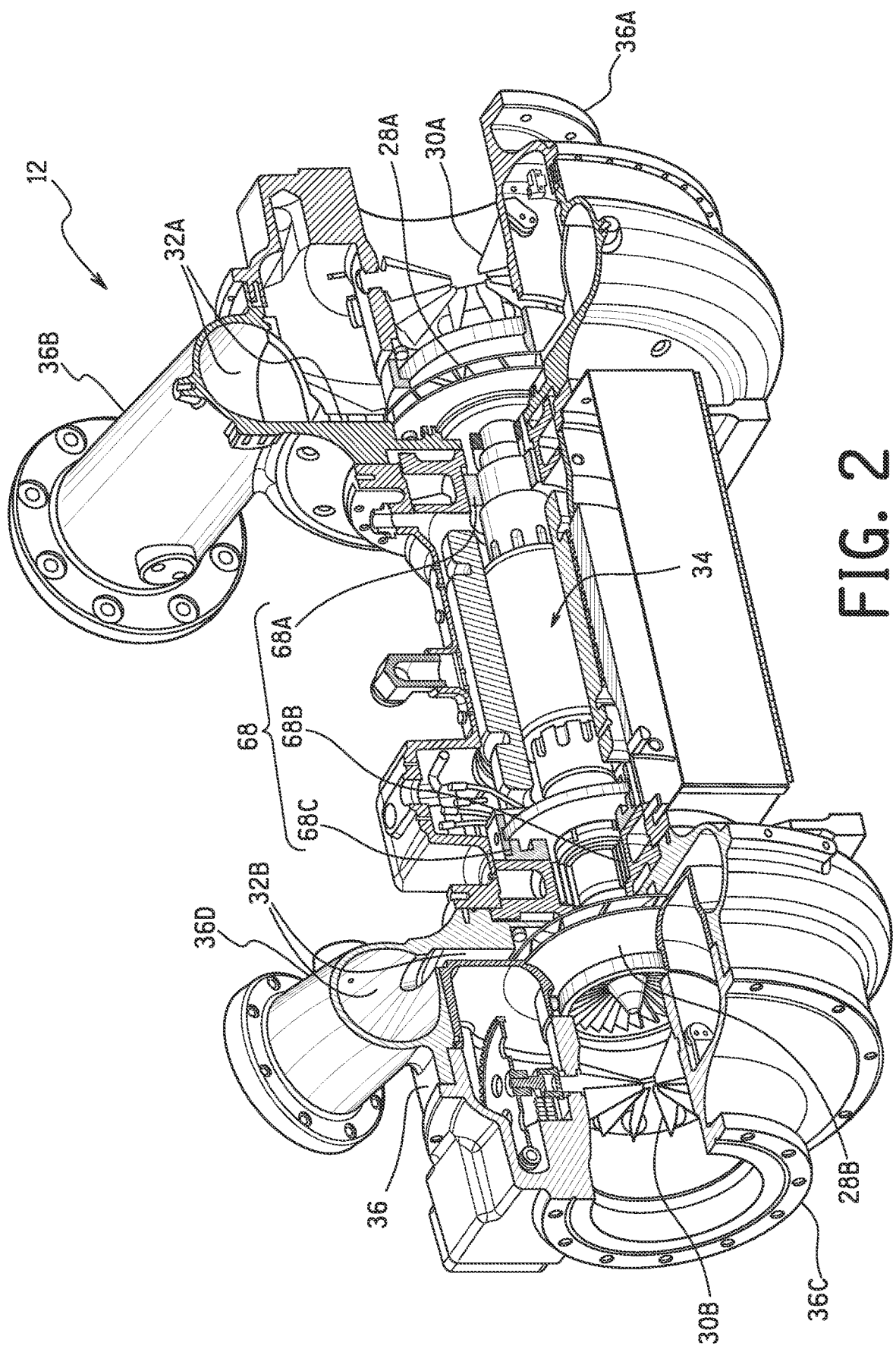
FIG. 2 is a perspective view of the centrifugal compressor of the chiller system illustrated in FIG. 1, with portions broken away and shown in cross-section for the purpose of illustration.
Figure 3:
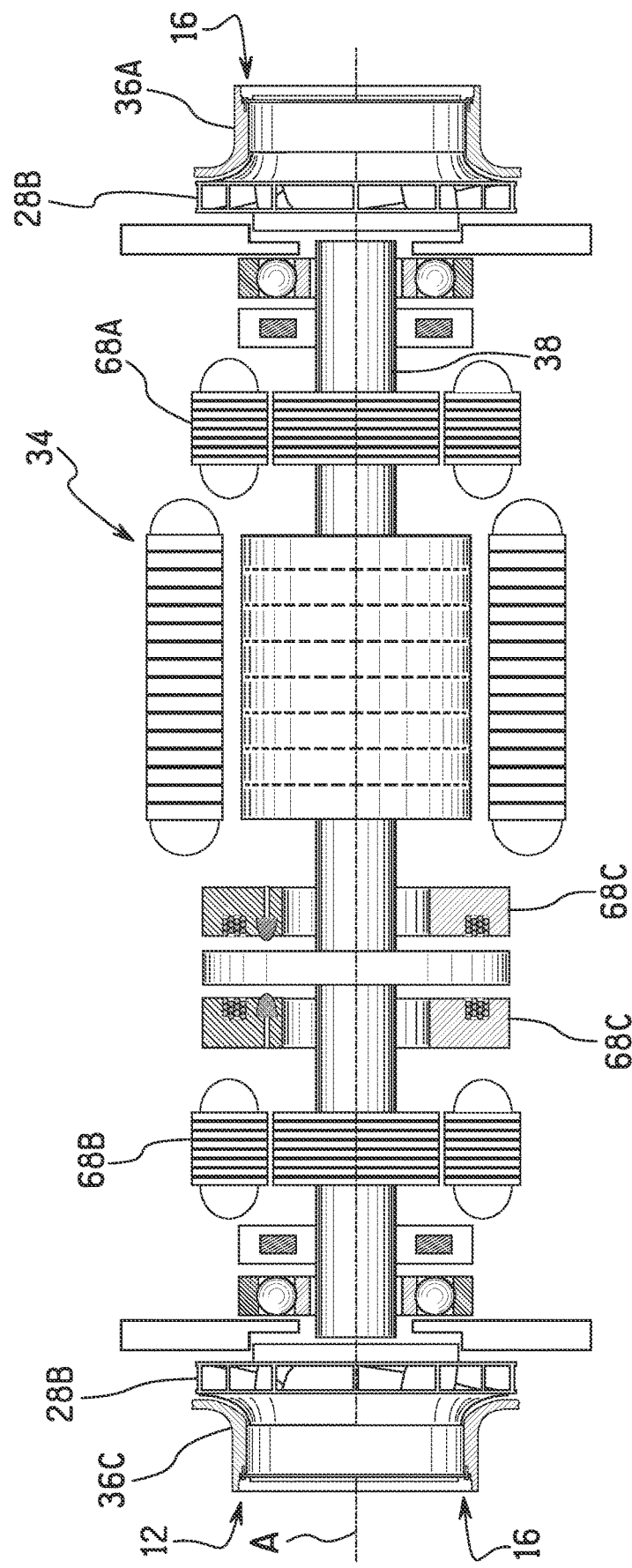
FIG. 3 is a schematic longitudinal cross-sectional view of the impellers, motor and labyrinth seals of the centrifugal compressor illustrated in FIGS. 1 and 2.
Figure 12:
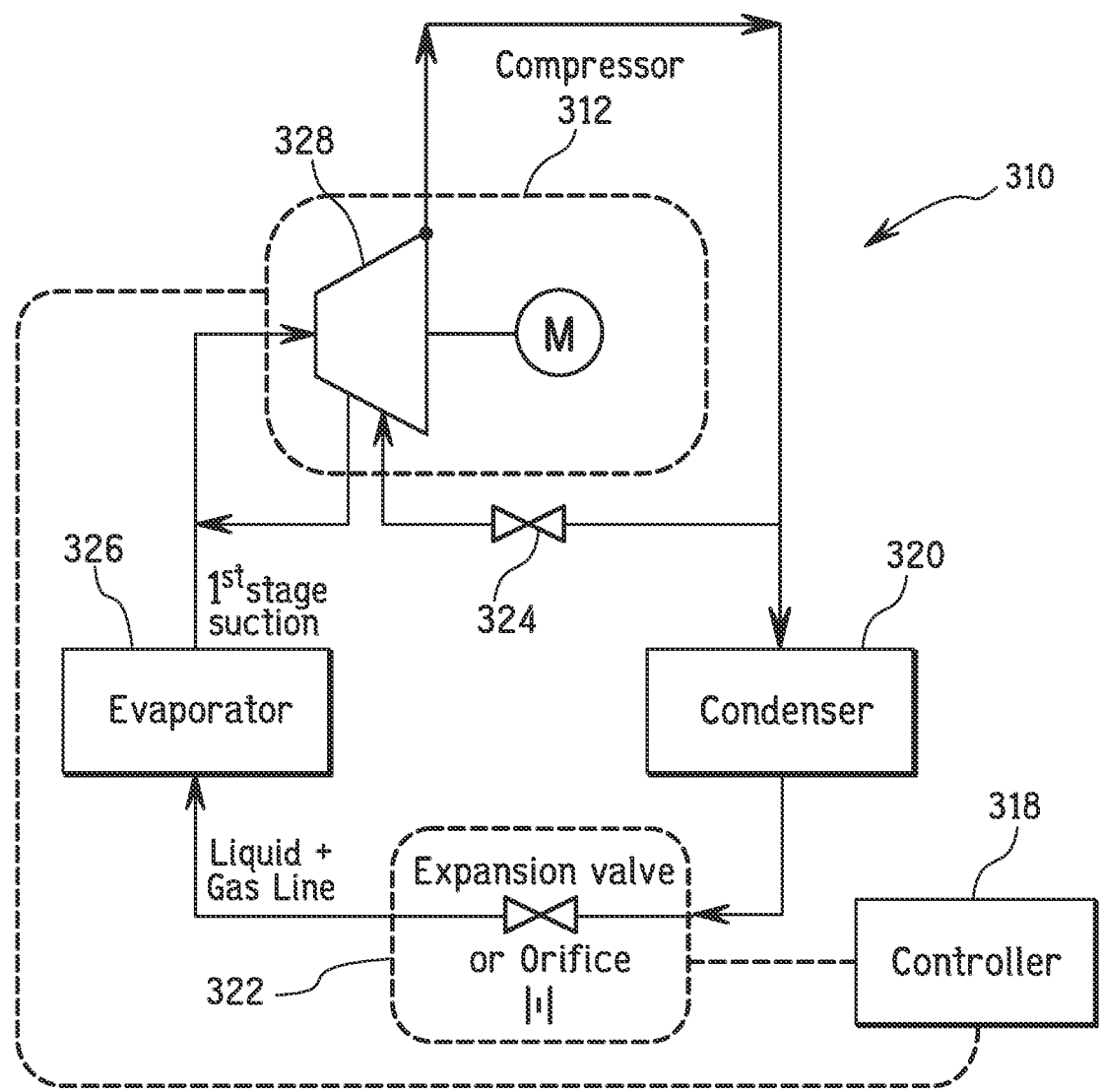
FIG. 12 is a schematic diagram illustrating a single stage chiller system having a centrifugal compressor in accordance with another exemplary embodiment.

The compressor 12 is a two-stage centrifugal compressor, as shown in FIGS. 1-3. The compressor 12 illustrated herein includes two impellers. However, the compressor 12 can include three or more impellers (not shown) or may be a single stage compressor as shown in FIG. 12. The two-stage centrifugal compressor 12 is conventional except that the compressor 12 includes the labyrinth seal 16, as shown in FIGS. 3-6.

The centrifugal compressor 12 includes two impellers 28. In other words, the compressor 12 includes a first stage impeller 28A and a second stage impeller 28B. The centrifugal compressor 12 further includes a first stage inlet guide vane 30A, a first diffuser/volute 32A, a second stage inlet guide vane 30B, and a second diffuser/volute 32B, a compressor motor, or motor assembly, 34. The motor 34 is configured to drive the compressor 12. A casing 36 covers the centrifugal compressor 12. The casing 36 includes an inlet portion 36A and an outlet portion 36B for the first stage of the compressor 12. The casing 36 also includes an inlet portion 36C and an outlet portion 36D for the second stage of the compressor 12.

The chiller controller 18 receives signals from the various sensors and controls the inlet guide vanes 30A and 30B, and the compressor motor 34 in a conventional manner, as explained in more detail below. Refrigerant flows in order through the first stage inlet guide vane 30A, the first stage impeller 28A, the second stage inlet guide vane 30B, and the second stage impeller 28B. The inlet guide vanes 30A and 30B control the flow rate of refrigerant gas into the impellers 28A and 28B, respectively, in a conventional manner. The impellers 28A and 28B increase the velocity of refrigerant gas, generally without changing pressure. The motor speed determines the amount of increase of the velocity of refrigerant gas. The diffusers/volutes 32A and 32B increase the refrigerant pressure. The diffusers/volutes 32A and 32B are non-movably fixed relative to the casing 36. The compressor motor 34 rotates the impellers 28A and 28B via a shaft 42. The shaft 42 of the centrifugal compressor 12 can be supported on a magnetic bearing assembly 68 that is fixedly supported to the casing 36. The magnetic bearing assembly 68 includes a first radial magnetic bearing 68A, a second radial magnetic bearing 68B, and an axial magnetic bearing 68C. In this manner, the refrigerant is compressed in the centrifugal compressor 12.

In operation of the chiller system 10, the first stage impeller 28A and the second stage impeller 28B of the compressor 12 are rotated, and the refrigerant of low pressure in the chiller system 10 is sucked by the first stage impeller 28A. The flow rate of the refrigerant is adjusted by the inlet guide vane 30A. The refrigerant sucked by the first stage impeller 28A is compressed to intermediate pressure, the refrigerant pressure is increased by the first diffuser/volute 32A, and the refrigerant is then introduced to the second stage impeller 28B. The flow rate of the refrigerant is adjusted by the inlet guide vane 30B. The second stage impeller 28B compresses the refrigerant of intermediate pressure to high pressure, and the refrigerant pressure is increased by the second diffuser/volute 32B. The high pressure gas refrigerant is then discharged to the chiller system 10.

The refrigerant used in the chiller system 10, and other HVAC applications, is a low global warming potential (low GWP) refrigerant to reduce the impact on the environment caused by the release of refrigerants into the atmosphere. GWP is a measure of a greenhouse gas when it is released into the atmosphere and benchmarked against $CO_2$, which is defined to have a GWP equal to one. Thus, GWP is a measure of the potential for a refrigerant or other gas to behave as a greenhouse gas, which can contribute to global warming. The lower the GWP rating, or "GWP value", the lower the potential of the refrigerant to behave as a greenhouse gas when released into the atmosphere. Examples of low-GWP refrigerants for HVAC applications include R1233zd, R1234ze and R1234yf. Each of R1233zd, R1234ze and R1234yf has a global warming potential (GWP)<10. In this application, "low-GWP refrigerant" shall be defined as a refrigerant having a GWP value smaller than 10. Alternatively, the refrigerant can be a low pressure refrigerant, such as R1233zd, in which the evaporation pressure is equal to or less than the atmospheric pressure. Preferably, the refrigerant is at least one of a low pressure refrigerant and a low global warming potential refrigerant.

A stepped labyrinth seal 16 is disposed between each impeller 28A and 28B and the casing 36, as shown in FIG. 3. The labyrinth seals 16 are substantially identically configured, such that the following description refers to the labyrinth seal disposed between the second stage impeller 28B and the casing 36, as shown in FIGS. 3-6.

Figure 4:
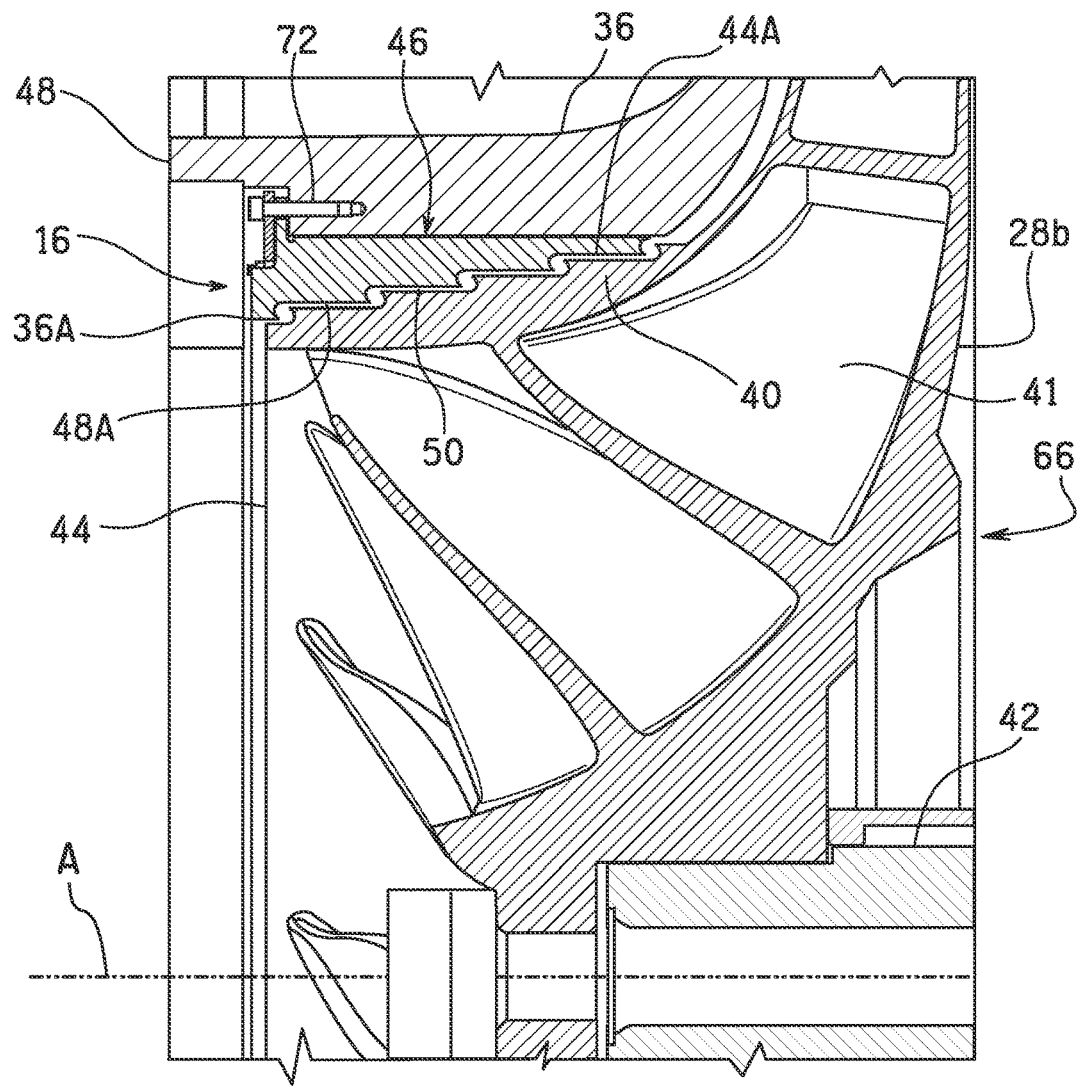
FIG. 4 is an elevational view in cross-section of the labyrinth seal of the centrifugal compressor FIGS. 1-3.

The second stage impeller 28B includes a shroud 40 disposed at ends of the impeller blades 41, as shown in FIG. 4. The impeller 28B and the shroud 40 form a rotor 44 having a rotor profile 44A. The rotor 44 is rotatable about a rotational axis A, as shown in FIG. 4.

A seal member 46 is connected to an inner surface 36A of the casing 36, as shown in FIG. 4. The casing 36 and the seal member 46 define a stator 48 having a stator profile 48A.

Figure 5:
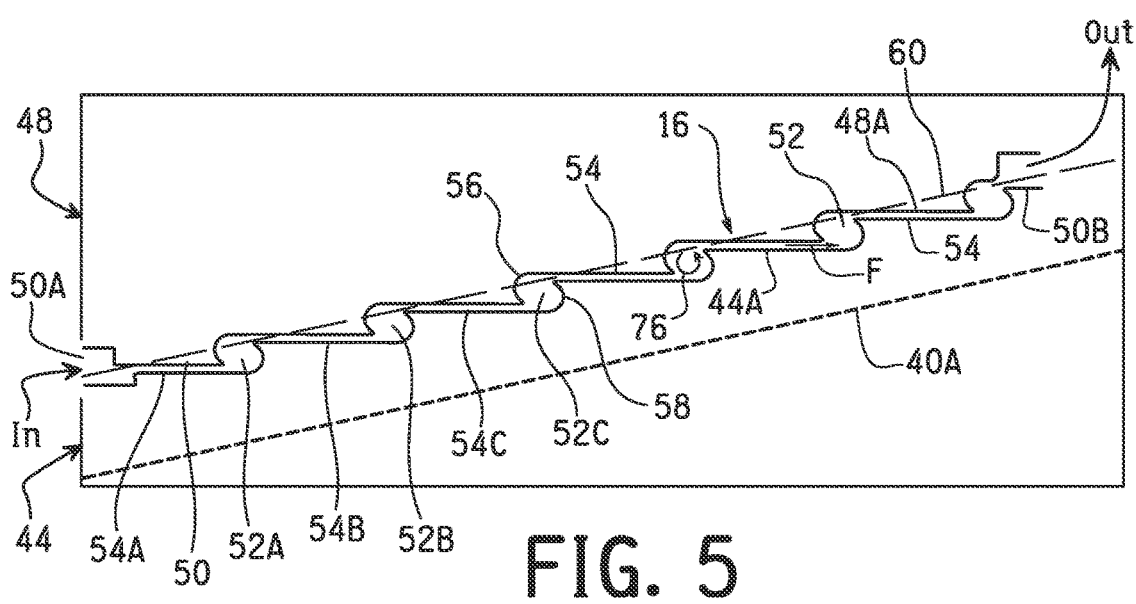
FIG. 5 is an enlarged cross-sectional view of the labyrinth seal of FIG. 4.

An impeller assembly 66 includes the stator 48 having the stator profile 48A and the rotor 44 having the rotor profile 44A, as shown in FIGS. 4 and 5.

A gap 50 is defined between the rotor 44 and the stator 48 to facilitate rotation of the rotor 44 within the stator 48, as shown in FIGS. 3-6. In other words, the stator 48 and the rotor 44 are separated from each other by the gap 50 formed between the stator profile 48A and the rotor profile 44A. The gap 50 includes an inlet 50A and an outlet 50B. A plurality of cavities 52 and a plurality of channels 54 fluidly connect the inlet 50A and the outlet 50B of the gap 50. The gap 50 preferably includes at least three cavities 52 and a plurality of channels 54, as shown in FIG. 5. Each channel 54 connects two cavities 52 adjacently disposed in a flow direction F through the gap 50. The gap 50 has an average direction. The average direction of the gap 50 is defined by a line 60 connecting the inlet 50A to the outlet 50B. As shown in FIG. 5, the line 60 is substantially parallel to a slope 40A of the shroud 40.

Figure 6:
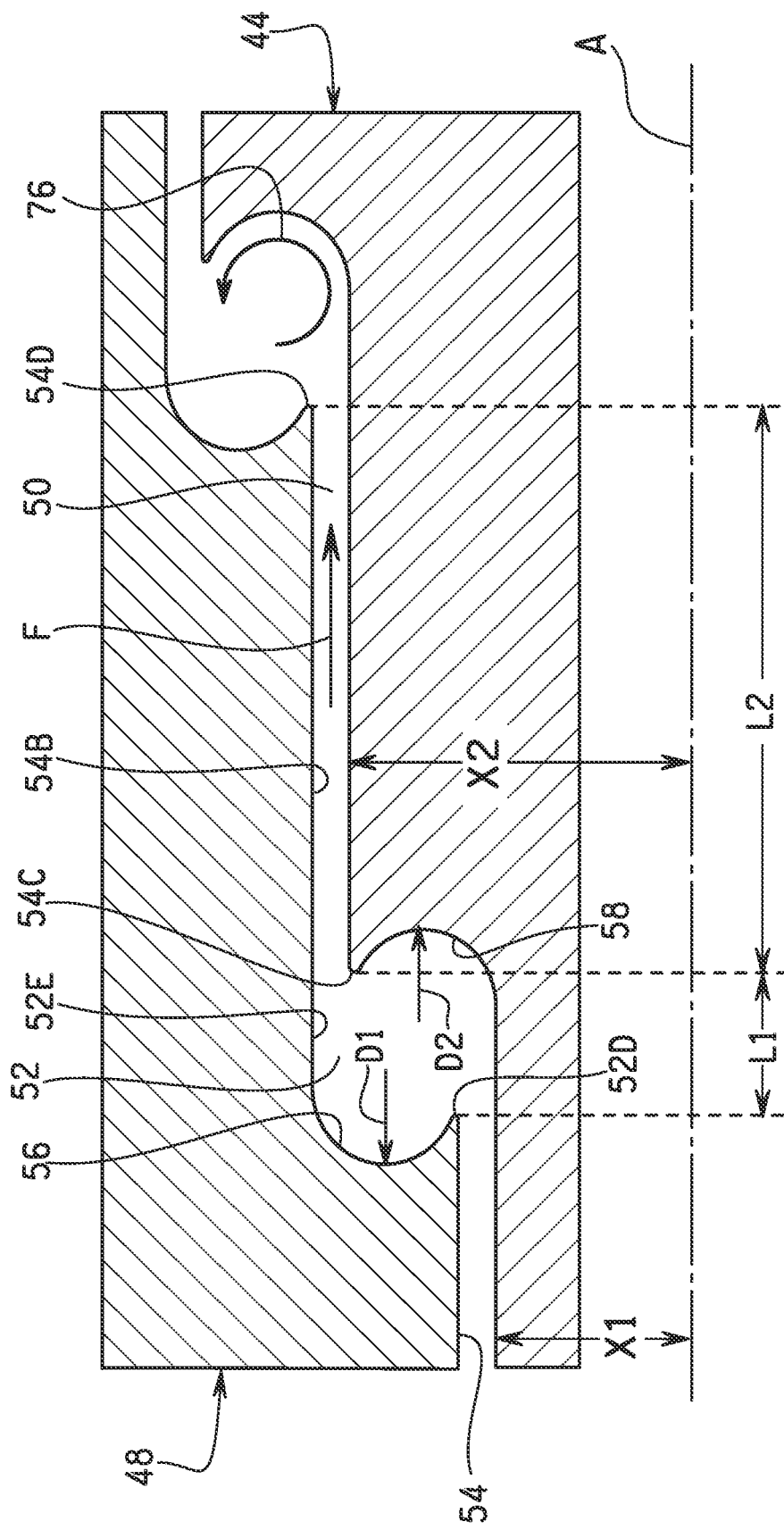
FIG. 6 is an enlarged cross-sectional view of a channel of the labyrinth seal of FIG. 5.

A portion of the channel 54 defined by the stator profile 48A, as shown in FIGS. 4-6, is connected to a portion of the cavity 52 defined by the stator profile 48A. A portion of the channel 54 defined by the rotor profile 44A is connected to a portion of the cavity 52 defined by the rotor profile 44A.

As shown in FIGS. 4-6, at least two of the cavities 52 are connected by one of the plurality of channels 54. A first cavity 52A and a second cavity 52B are connected by the channel 54A.

Each cavity 52 includes a first concave portion 56 defined by the stator profile 48A and a second concave portion 58 defined by the rotor profile 44A, as shown in FIGS. 4-6. The first concave portion 56 is positioned at least partially opposite from the second concave portion 58. The first concave portion 56 extends in a first direction D1, as shown in FIG. 6. The second concave portion extends in a second direction D2 opposite to the first direction D1. The first direction D1 and the second direction D2 are within about 45 degrees of opposite of each other. In other words, an angle formed between the first direction D1 and the second direction D2 is between approximately 135 degrees and approximately 225 degrees. The first direction D1 and the second direction D2 are preferably between approximately 40 degrees and approximately 90 degrees from the rotational axis A. In other words, an angle formed between the first direction D1 and the rotational axis A is between approximately 40 degrees and approximately 90 degrees, and an angle formed between the second direction D2 and the rotational axis A is approximately 40 degrees and approximately 90 degrees.

As shown in FIG. 5, a first channel 54A extends between a first cavity 52A and a second cavity 52B. A second channel 54B extends between the second cavity 52B and a third cavity 52C. The first and second channels 54A and 54B are non-collinear. As shown in FIG. 6, the first channel 54A is a first distance X1 from the rotational axis A, and the second channel 54B is a second distance X2 from the rotational axis A. The first distance X1 and the second distance X2 are different from one another, such that the plurality of channels 54 form a stepped configuration between the inlet 50A and the outlet 50B of the gap 50.

Each channel 54 has a first end 54C and a second end 54D, as shown in FIG. 6. Each cavity 52 has an inlet end 52D and an outlet end 52E. A first distance L1 between the inlet end 52D and the outlet end 52E of each cavity 52 is at least ⅕ of a second distance L2 between the first end 54C and the second end 54D of each channel 54. More preferably, the first distance L1 between the inlet end 52D and the outlet end 52E of each cavity 52 is at least ¼ of the second distance L2 between the first end 54C and the second end 54D of each channel 54. Still more preferably, the first distance L1 between the inlet end 52D and the outlet end 52E of each cavity 52 is at least ⅓ of the second distance L2 between the first end 54C and the second end 54D of each channel 54. The distance L1 can be any suitable length, such as approximately 1.023 inches or 2.60 cm.

The stepped labyrinth seal 16, as shown in FIGS. 3-6, minimizes refrigerant leakage around the outside of the impeller 28. In other words, the labyrinth seal 16 minimizes refrigerant leakage between the rotor 44 and the stator 48. The stepped configuration of the labyrinth seal 16 slows the flow of the leaked refrigerant, thereby increasing the flow of refrigerant through the impeller 28.

Figure 7:
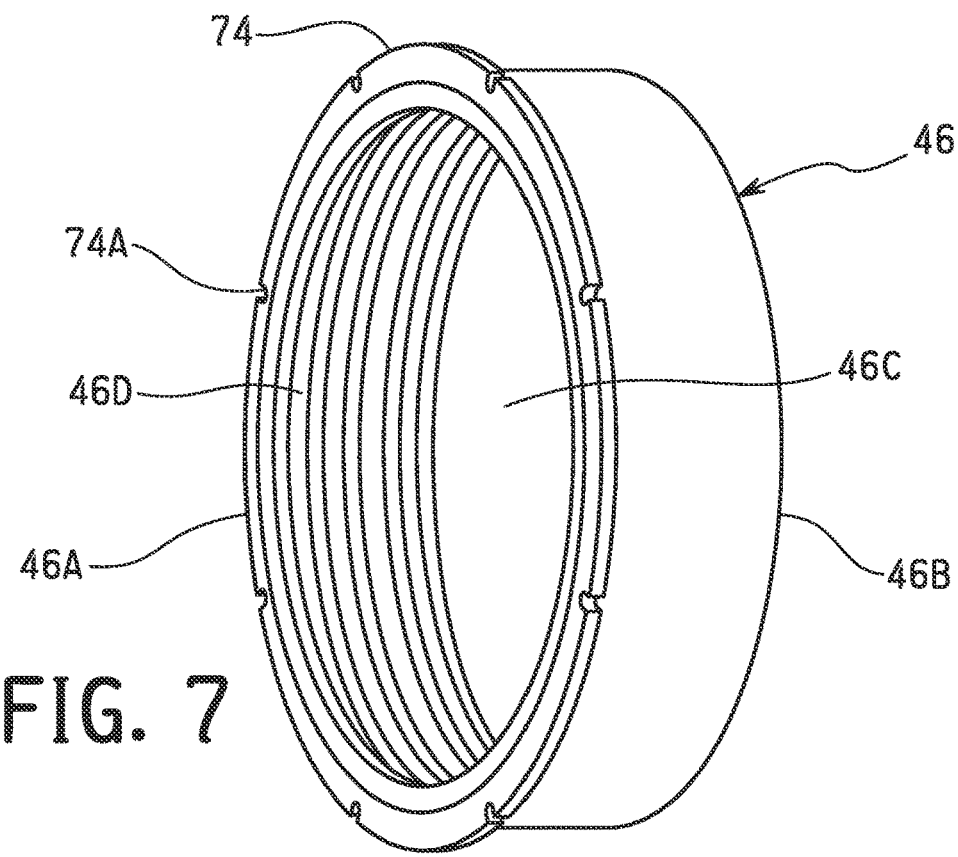
FIG. 7 is an enlarged cross-sectional view of a labyrinth seal having a groove in accordance with another exemplary embodiment.
Figure 8:
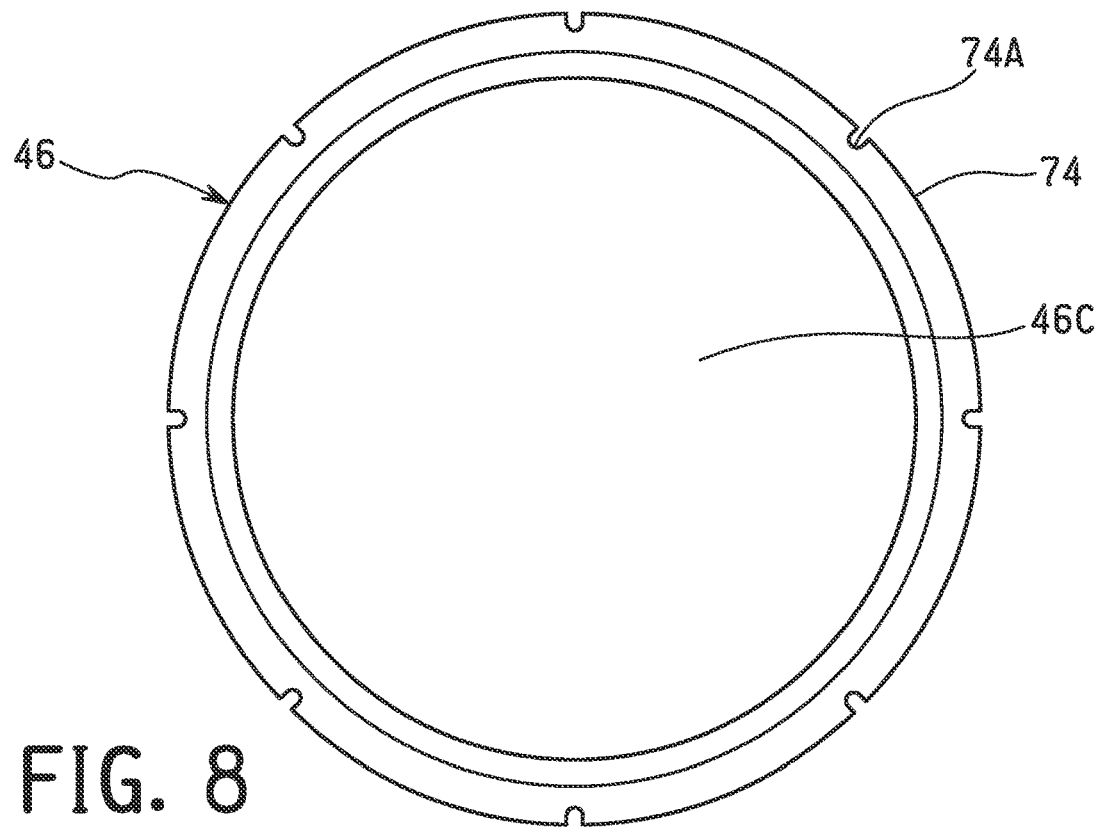
FIG. 8 is a perspective view of a seal member of the labyrinth seal of FIG. 7.

The seal member 46 is connected to the casing 36 by a plurality of fasteners 72, as shown in FIG. 4. The seal member 46 has a flange 74 disposed at a first end 46A, as shown in FIGS. 7 and 8. A plurality of fastener openings 74A formed in the outer periphery of the flange are configured to receive the plurality of fasteners 72. An opening 46C extends through the seal member 46 from the first end 46A to a second end 46B The inner surface 46D of the seal member 46 forms the stator profile 48A. The seal member 46 can be formed of any suitable material, such as a thermoplastic.

During operation of the compressor 12, leaked gas refrigerant enters the gap between the rotor 44 and the stator 48 through the gap inlet 50A, as shown in FIGS. 4 and 5. The leaked refrigerant flows through the first channel 54A into a first cavity 52A. The leaked refrigerant flows from the first cavity 52A through the second channel 54B to the second cavity 52B. The leaked refrigerant flows from the second cavity 52B through the third channel 54C to the third cavity 52C. The leaked refrigerant flows downstream through a plurality of channels 54 and cavities 52 to the gap outlet 50B. A swirl 76 is generated as the leaked refrigerant enters each cavity 52, thereby reducing the flow rate of the leaked refrigerant, as shown in FIGS. 5 and 6. The leaked refrigerant is discharged through the gap outlet 50B to join the refrigerant discharged from the impeller 28. The stepped labyrinth seal 16 in accordance with the exemplary embodiment improves the efficiency and performance of the compressor 12 by minimizing refrigerant leakage around the outside of the impeller 28 to increase the flow of refrigerant through the impeller 28.

Figure 9:
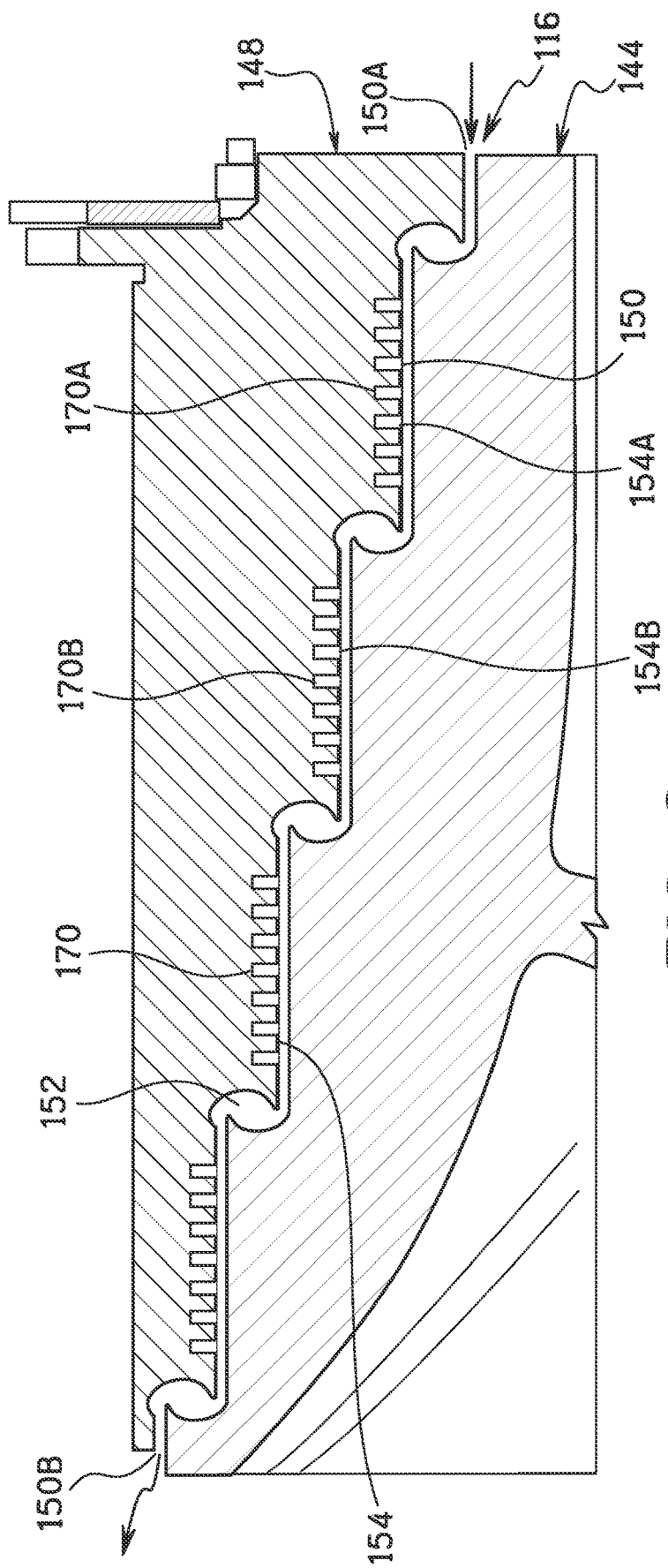
FIG. 9 is a front elevational view of the seal member of FIG. 8.

As shown in FIG. 9, a stepped labyrinth seal 116 in accordance with another illustrated exemplary embodiment of the present invention is substantially similar to the stepped labyrinth seal 16 illustrated in FIGS. 1-6 except for the differences described below. Similar parts are identified with similar reference numerals, except increased by 100 (i.e., 1xx, accordingly).

The stepped labyrinth seal 116 illustrated in FIG. 9 includes a gap 150 formed between the stator 148 and the rotor 144. The gap 150 includes an inlet 150A and an outlet 150B through which leaked refrigerant flows Each channel 154 has a plurality of grooves 170, as shown in FIG. 9. The plurality of grooves 170 can have any suitable configuration, such as a plurality of horizontally extending grooves extending between adjacent cavities 152, or a plurality of concentric grooves as shown in FIG. 7.

A first channel 154A has a first plurality of grooves 170A. The second channel 154B has a second plurality of grooves 170B. The plurality of grooves 170A are formed in the stator 148. The plurality of grooves 170 increase the surface area of the gap 150 through which the leaked refrigerant flows, thereby reducing the flow rate of the leaked refrigerant through the gap 150.

Figure 10:
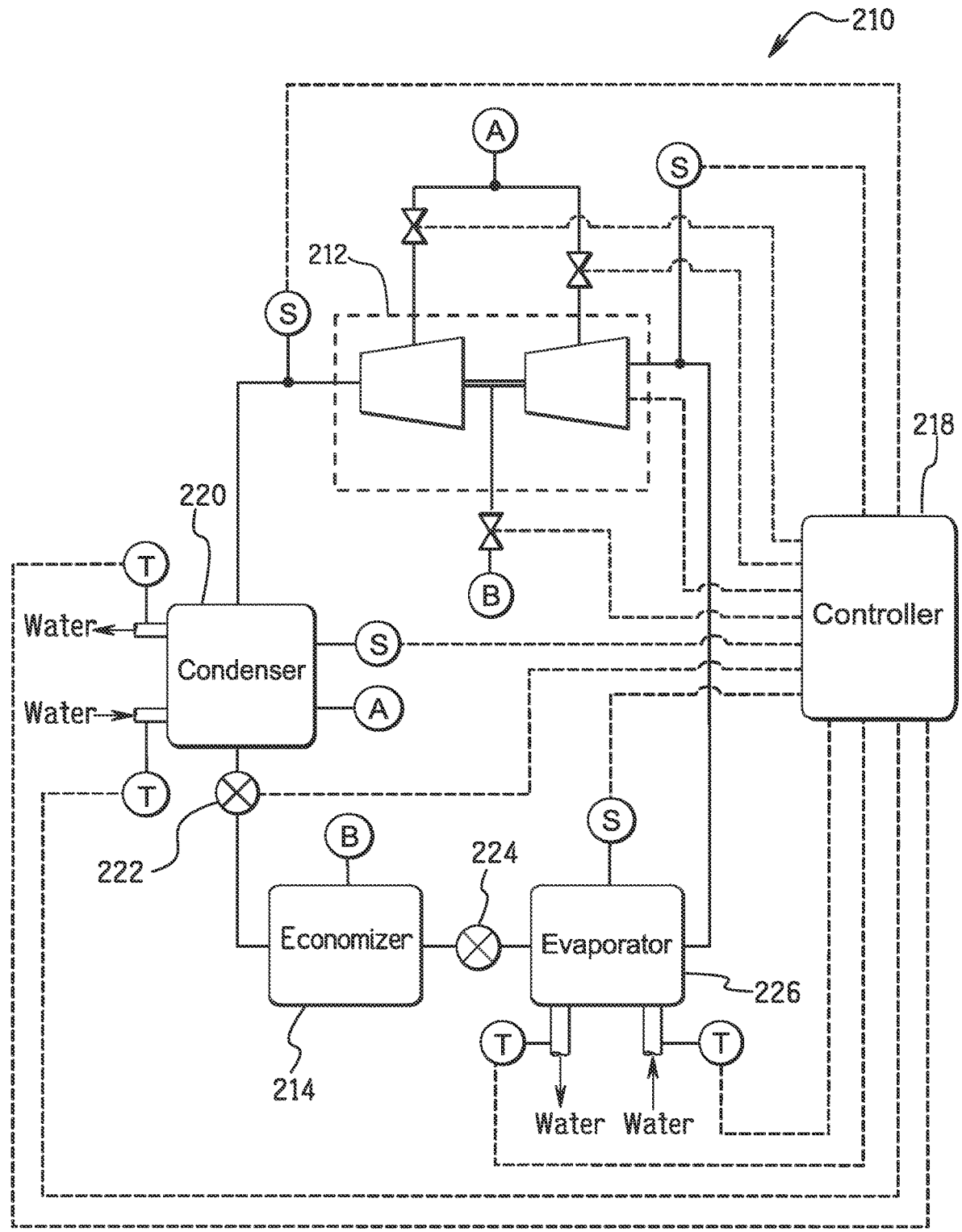
FIG. 10 is a schematic diagram illustrating a two stage chiller system having an inline compressor in accordance with another exemplary embodiment.
Figure 11:
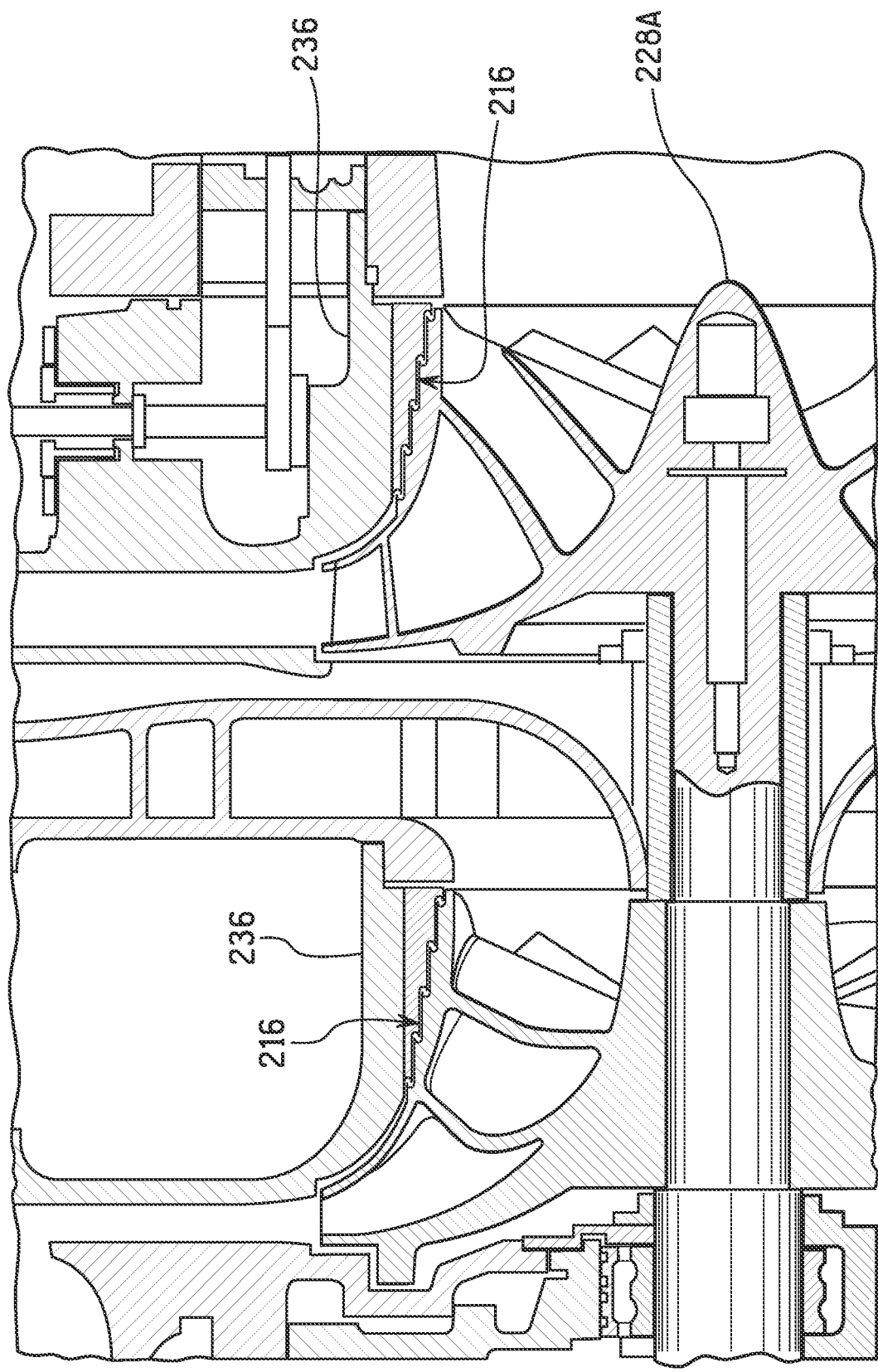
FIG. 11 is an elevational view in cross-section of a compressor of the chiller system of FIG. 10.

As shown in FIGS. 10 and 11, a chiller system 210 in accordance with another illustrated exemplary embodiment of the present invention is substantially similar to the chiller system illustrated in FIG. 1 except for the differences described below. Similar parts are identified with similar reference numerals, except increased by 200 (i.e., 2xx, accordingly).

The chiller system 210 basically includes a centrifugal compressor 212, a chiller controller 218, a condenser 220, an economizer 214, expansion valves 220 and 224, and an evaporator 226 connected together in series to form a loop refrigeration cycle. In addition, various sensors S and T may be disposed throughout the circuit of the chiller system 210. The chiller system 210 may include orifices instead of the expansion valves 220 and 224. The centrifugal compressor 212 is a two-stage in-line centrifugal compressor, as shown in FIGS. 10 and 11.

The chiller system 210 is conventional, except for the compressor 212, which includes labyrinth seals 216. The compressor 212 includes a stepped labyrinth seal in association with each of the impellers 228A and 228B, similarly to the stepped labyrinth seal illustrated in FIGS. 3-6. The labyrinth seal 216 is formed between the stator, such as the casing 236, and a rotor, such as the impellers 228A and 228B, as shown in FIG. 11.

As shown in FIG. 12, a chiller system 310 in accordance with another illustrated exemplary embodiment of the present invention is substantially similar to the chiller system illustrated in FIG. 1 except for the differences described below. Similar parts are identified with similar reference numerals, except increased by 300 (i.e., 3xx, accordingly).

The chiller system illustrated in FIG. 12 basically includes basically includes a chiller controller 318, a compressor 312, a condenser 320, an expansion valve or orifice (expansion mechanism) 322, and an evaporator 326 connected together in series to form a loop refrigeration cycle. The chiller systems 310 can further include an expansion valve (expansion mechanism) configured to supply refrigerant gas to a magnetic bearing backup system of the compressor 212.

The centrifugal compressor 312 of FIG. 12 is a single stage compressor, and thus, the chiller system 310 of FIG. 12 is a single stage chiller system. The chiller system 310 is conventional, except for the compressor 312, which includes labyrinth seals. The compressor 312 includes a stepped labyrinth seal in association with the impeller 328, similarly to the stepped labyrinth seal illustrated in FIGS. 3-6.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

Additionally, the term "low global warming potential (GWP) refrigerant" used herein refers to any refrigerant or blend of refrigerants that is suitable for use in the refrigeration circuit of a chiller system and has a low potential for contributing to global warming as benchmarked against $CO_2$ gas. The refrigerants R1233zd, R1234ze, and R1234fy are cited in this application as examples of low-GWP refrigerants. However, a person of ordinary skill in the refrigeration field will recognize that the present invention is not limited to these refrigerants.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A chiller system comprising:
a condenser;
an evaporator;
a compressor including an impeller assembly;
an input suction line for gas refrigerant movement from the evaporator to the compressor;
an output discharge line for gas refrigerant movement from the compressor to the condenser; and
a motor assembly configured to drive the compressor;
the impeller assembly including
a stator having a stator profile; and
a rotor having a rotor profile, the rotor being rotatable about a rotational axis,
the stator and the rotor being separated from each other by a gap formed between the stator profile and the rotor profile;
the gap including an inlet, an outlet, and at least two cavities connected by a channel,
each cavity including a first concave portion defined by the stator profile and a second concave portion defined by the rotor profile, the first concave portion being positioned at least partially opposite from the second concave portion,
an upstream channel and a downstream channel are connected to a first cavity of the at least two cavities,
the upstream channel being connected to the first cavity at a first position in a direction orthogonal to the rotational axis, the downstream channel being connected to the first cavity at a second position in the direction orthogonal to the rotational axis, and the first position being closer to the rotational axis than the second position.

2. The chiller system according to claim 1, wherein the gap includes at least three cavities and a plurality of channels, each channel of the plurality of channels connecting two cavities adjacently disposed in a flow direction through the gap.

3. The chiller system according to claim 2, wherein a first channel extends between a first cavity and a second cavity, and a second channel extends between the second cavity and a third cavity, the first and second channels being non-collinear.

4. The chiller system according to claim 1, wherein each channel has a first end and a second end, each cavity has an inlet end and an outlet end, a first distance between the inlet end and the outlet end of each cavity being at least 1/5 of a second distance between the first end and the second end of each channel.

5. The chiller system according to claim 1, wherein the gap has an average direction, the average direction of the gap being defined by a line connecting the inlet to the outlet.

6. The chiller system according to claim 1, wherein the first concave portion extends in a first direction and the second concave portion extends in a second direction, the first direction and the second direction being between approximately forty degrees and approximately 90 degrees from the rotational axis.

7. The chiller system according to claim 1, wherein the refrigerant is a low global warming potential refrigerant.

8. The chiller system according to claim 7, wherein the refrigerant is a low pressure refrigerant.

9. A chiller system comprising:
a condenser;
an evaporator;
a compressor including an impeller assembly;
an input suction line for gas refrigerant movement from the evaporator to the compressor;
an output discharge line for gas refrigerant movement from the compressor to the condenser; and
a motor assembly configured to drive the compressor;
the impeller assembly including
a stator having a stator profile; and
a rotor having a rotor profile, the rotor being rotatable about a rotational axis,
the stator and the rotor being separated from each other by a gap formed between the stator profile and the rotor profile;
the gap including an inlet, an outlet, and at least three cavities and a plurality of channels, each channel of the plurality of channels connecting two cavities adjacently disposed in a flow direction through the gap,
each cavity including a first concave portion defined by the stator profile and a second concave portion defined by the rotor profile, the first concave portion being positioned at least partially opposite from the second concave portion,
a first channel extending between a first cavity and a second cavity, and a second channel extending between the second cavity and a third cavity, the first and second channels being non-collinear,
the second concave portion of the second cavity being at least partially disposed on a first imaginary line extending along the first channel, and the first concave portion of the second cavity being at least partially disposed on a second imaginary line extending along the second channel.

10. A chiller system comprising:
a condenser;
an evaporator;
a compressor including an impeller assembly;
an input suction line for gas refrigerant movement from the evaporator to the compressor;
an output discharge line for gas refrigerant movement from the compressor to the condenser; and
a motor assembly configured to drive the compressor;
the impeller assembly including
a stator having a stator profile; and
a rotor having a rotor profile, the rotor being rotatable about a rotational axis,
the stator and the rotor being separated from each other by a gap formed between the stator profile and the rotor profile;
the gap including an inlet, an outlet, and at least two cavities connected by a channel, each cavity including a first concave portion defined by the stator profile and a second concave portion defined by the rotor profile, the first concave portion being positioned at least partially opposite from the second concave portion, in a direction along the rotational axis, a first distance from a center of a first cavity which is disposed upstream of the channel to an upstream end of the channel being smaller than a second distance from the center of the first cavity to a mid-portion of the second concave portion of the first cavity, the mid-portion of the second concave portion of the first cavity being disposed at a mid-point of the second concave portion of the first cavity in a direction perpendicular to the direction along the rotational axis.

11. A chiller system comprising:
   a condenser;
   an evaporator;
   a compressor including an impeller assembly;
   an input suction line for gas refrigerant movement from the evaporator to the compressor;
   an output discharge line for gas refrigerant movement from the compressor to the condenser; and
   a motor assembly configured to drive the compressor;
   the impeller assembly including
      a stator having a stator profile; and
      a rotor having a rotor profile, the rotor being rotatable about a rotational axis,
      the stator and the rotor being separated from each other by a gap formed between the stator profile and the rotor profile;
      the gap including an inlet, an outlet, and at least two cavities connected by a channel,
      each cavity including a first concave portion defined by the stator profile and a second concave portion defined by the rotor profile, the first concave portion being positioned at least partially opposite from the second concave portion,
   the channel having a substantially constant distance from a rotor side of the channel to the rotational axis,
   each of the at least two cavities provided in the gap having a substantially similar shape.

* * * * *